(12) United States Patent
Tsao et al.

(10) Patent No.: US 6,504,969 B1
(45) Date of Patent: Jan. 7, 2003

(54) TUNABLE OPTICAL ENCODER AND DECODER

(75) Inventors: Shyh-Lin Tsao, Taipei Hsien (TW); Jingshown Wu, Taipei (TW); Che-Li Lin, Taipei (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/518,121

(22) Filed: Mar. 3, 2000

(30) Foreign Application Priority Data

Mar. 6, 1999 (TW) .......................... 88103451 A

(51) Int. Cl.$^7$ .......................... G02B 6/28; H04B 10/12
(52) U.S. Cl. .......................... 385/24; 359/179; 385/15
(58) Field of Search .......................... 385/15, 24, 27, 385/30, 39, 40, 41, 42, 47, 48; 359/119, 124, 127, 179

(56) References Cited

U.S. PATENT DOCUMENTS 4,473,270 A * 9/1984 Shaw .......................... 385/30
4,652,079 A * 3/1987 Shaw et al. .......................... 385/30
4,815,804 A * 3/1989 Desurvire et al. .......................... 385/27
4,890,893 A * 1/1990 Smoot .......................... 359/124

* cited by examiner

Primary Examiner—John D. Lee
(74) Attorney, Agent, or Firm—Fish & Richardson P.C.

(57) ABSTRACT

The present invention discloses an encoder and a decoder that are tunable, controllable, and have low amount of energy loss during encoding or decoding. The encoder comprises a 2×2 EO coupler, and an optical recirculating loop (waveguide) which comprises a semiconductor optic amplifier. The decoder comprises a 2×2 EO coupler, an optical recirculating loop (waveguide) which comprises a semiconductor optic amplifier, a light detector, and a bit determining device. Thus, the structures of the encoder and the decoder are simple, and can be integrated on a photonic integrated circuit so that the reliability is increased and the cost of production decreased.

17 Claims, 3 Drawing Sheets

TUNABLE OPTICAL ENCODER AND DECODER

BACKGROUND OF THE INVENTION

1. Field of the Invention

The present invention relates to an optical encoder and a decoder, which are easily controlled, fully tunable, and have low amount of energy loss during encoding or decoding. In particular, the apparatuses according to present invention have simple structures, and can be integrated on a photonic integrated circuit so that the reliability is increased and the cost of production decreased.

2. Description of the Prior Art

Fiber optic code division multiple access networks can provide bursty access communication channels. With the use of all optical signal processing, a data capture rate of hundreds of giga bytes per second is obtained. In addition, the spreading sequence codes having adventages of sharp autocorrelation function, small crosscorrelation, easily encoded and decoded, and having low amount of energy loss during encoding or decoding are desired. Accordingly, it is important to find codes that have the above-mentioned characteristics in order to encode and decode effectively.

Although several kinds of optical encoders or decoders have been developed over the past years, there are still problems remaining. For example, some arrangements use a large number of fiber optical delay lines, so manufacturing the devices becomes difficult. Moreover, there is energy loss during encoding or decoding, and the devices are not perfectly tuned. In other arrangements, the encoder or decoder can be perfectly tuned. However, the method of controlling the device is complicated, and the speed of the controlling signals is not high enough to effectively operate the device.

The spreading sequence technology for application in the fiber optical communication and methods of encoding and decoding prime codes are described in an article by P. R. Prucnal, "IEEE J. Lightwave Technol.," vol.4, no.5, pp.547–554, 1986. If the prime number is p, the encoder or decoder operates when p fiber optical delay lines having constant lengths is provided, respectively. However, the encoder or decoder mentioned above can merely encode or decode identical item codes, and the remaining optical power after the encoding and decoding process is $1/p^2$ of the original amount of power.

Quasi-prime codes produced by fiber lattice of an encoder or a decoder are presented in an article by A. S. Holmes, "IEEE J. Lightwave Technol.," vol.10, no.2, pp.279–286, 1992. The fiber lattice of an encoder comprises a plurality of Electro-Optic (EO) couplers and fiber optical delay lines, wherein each Electro-Optic coupler has two input and two output terminals (2×2 EO coupler hereinafter), and these 2×2 EO coupler are connected in series. The encoder is tunable; however, the numbers of the quasi-prime codes that the fiber lattice of the encoder can produce are less than that of the prime codes. Therefore, it is inconvenient to vary the code forms for processing. Additionally, this arrangement of the device can't operate effectively, and the amount of energy loss during encoding or decoding is substantial.

In an article of "IEEE Trans. Commun. vol.44, no.9, pp.1152~1162, 1996" by W. C. Kwong, $2^n$ prime codes and an encoder and a decoder are described. The numbers of the $2^n$ prime codes produced by the encoder are less than that of the prime codes mentioned above. In spite of this, the arrangement of the encoder is simpler than that in A. S. Holmes paper because only about $\log_2 n$ 2×2 EO couplers connected in series and fiber optical delay lines are needed, where n is the length of the $2^n$ prime codes. However, the encoder must be able to process high-speed electric signals.

An advance is described in U.S. Pat. No. 4,159,418, 1979 by E. Marom, which discloses an optical encoder or a decoder comprising of multi-mode optical fibers and several optical couplers. Generally, the encoder or decoder can merely encode or decode identical item codes. Further, the amount of energy loss will increase significantly if the multi-mode optical fiber is substituted by single mode optical fiber. Therefore, this kind of optical encoder or decoder is not appropriately applied in the fiber optic code division multiple access networks.

Another advance is described in the U.S. Pat. No. 5,610,746, 1997 by E. R. Ranalli, which discloses a wide band optical source comprising a light emitting diode (LED) that emits incoherent light which is then focused by a coupling lens into a waveguide. In addition, a coupler comprising an amplifier and a plurality of feedback waveguides which are rendered transmissive or absorbing is also described in the patent. This device is tunable; however, the feedback waveguides make the arrangement of the device complicated, and the amount of energy loss during encoding or decoding is substantial.

SUMMARY OF THE INVENTION

Accordingly, the object of the present invention is to provide an optical encoder and a decoder that are easily controlled, fully tunable, and have low amount of energy loss during encoding or decoding. Another object of the present invention is to provide an optical encoder and a decoder that have simple structures, and can be integrated on a photonic integrated circuit so that the reliability is increased and the cost of production decreased.

To achieve the above-mentioned object, an optical encoder for outputting multiple-level codes is provided, comprising: an Electro-Optic (EO) coupler having a first and a second input terminal, and having a first and a second output terminal; and an optical recirculating loop which comprises an amplifier coupled between the second output terminal and the second input terminal, wherein the first input terminal receives laser pulses, and the EO coupler divides the received laser pulses into a first group and a second group according to a coupling ratio, then couples the first group of laser pulses (feedback laser pulses) to the optical recirculating loop by the second outputting terminal, so that the feedback laser pulses are amplified by the amplifier, and the second input terminal receives the amplified feedback laser pulses which are fed back to the second group of laser pulses by the EO coupler, and the first output terminal outputs multiple-level pulses.

Furthermore, to achieve the above-mentioned object, an optical decoder for outputting a bit value is provided, comprising: an Electro-Optic (EO) coupler having a first and a second input terminal, and having a first and a second output terminal; an optical recirculating loop which comprises an amplifier coupled between the second output terminal and the second input terminal, wherein the first input terminal receives multiple-level pulses, and the EO coupler divides the received multiple-level pulses into a first group and a second group according to a coupling ratio, then couples the first group of multiple-level pulses (feedback multiple-level pulses) to the optical recirculating loop by the second outputting terminal, so that the feedback multiple-level pulses are amplified by the amplifier, and the second input terminal receives the amplified feedback multiple-level pulses which are fed back to the second group of multiple-level pulses by the EO coupler, and the first output terminal outputs light waves; a light detector, coupled to the output input terminal of the EO coupler, transforming the optical energy of the light waves into an electrical current; and a bit determining device coupled to the light detector for outputting a bit value.

BRIEF DESCRIPTION OF THE DRAWINGS

The present invention will become more fully understood from the detailed description given hereinbelow and the accompanying drawings, given by way of illustration only and thus not intended to be limitative of the present invention.

FIG. 1a shows an arrangement of a tunable optical encoder according to the present invention;

FIG. 1b shows an output waveform of the tunable optical encoder shown in FIG. 1a;

DETAILED DESCRIPTION OF THE INVENTION

Figures 1A, 1B:
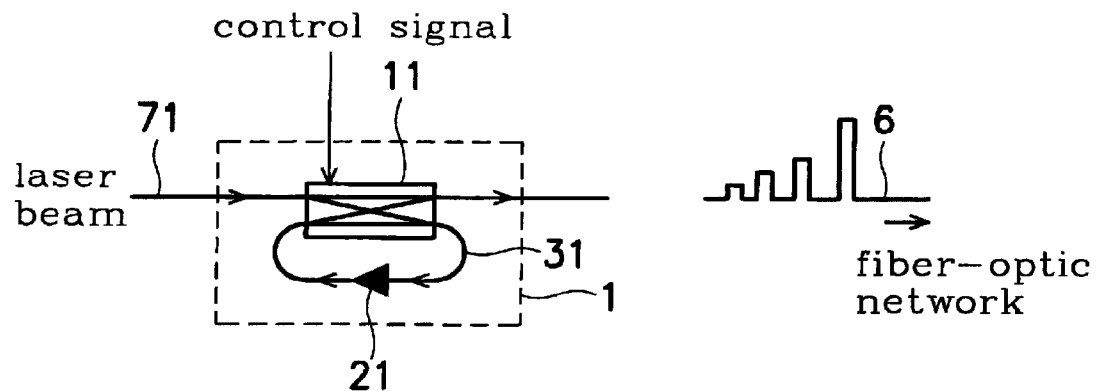

Referring to FIG. 1a, an arrangement of a tunable optical encoder according to the present invention is shown. The optical encoder 1 includes a 2×2 EO coupler 11, and an optical recirculating loop 31 (waveguide) which comprises a semiconductor optic amplifier 21.

At first, laser pulses are inputted into the 2×2 EO coupler 11 through the waveguide 71. Then the 2×2 EO coupler 11 divides the received laser pulses into a first group and a second group according to optical coupling ratios varied with controlling signals (chips) which are inputted from the control signal input terminal (not shown) of the 2×2 EO coupler 11, then couples the first group of laser pulses to the optical recirculating loop 31. The laser pulses coupled to the optical recirculating loop 31 are amplified by the semiconductor optic amplifier 21 to compensate the amount of optical energy loss when the laser pulses are circulated. It is noted that the prime code applied in a fiber optic code division multiple access network is processed by the 2×2 EO coupler 11 and the semiconductor optic amplifier 21 (i.e. optical encoder 1), wherein the prime code has p chips of 1, and $(p^2-p)$ chips of 0 if the prime number is p. When the chip equals to 0, the coupling ratio of the 2×2 EO coupler 11 is set to 0. The loop gain of the optical recirculating loop 31 is set to 1 by adjusting the gain of the semiconductor optic amplifier 21.

Figure 3A:
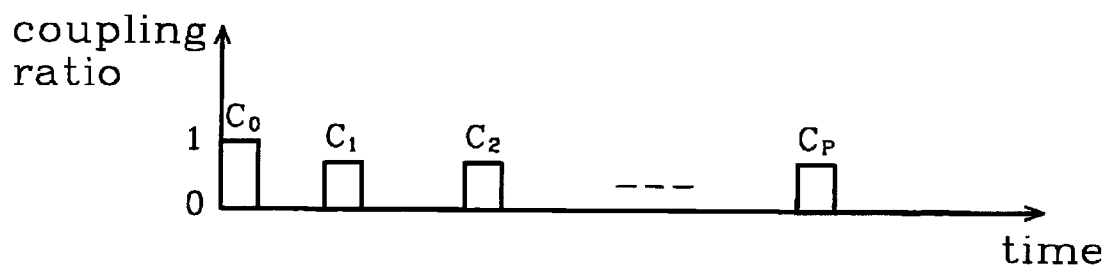
FIG. 3a and FIG. 3b show the operations of the tunable optical encoder and decoder, respectively.

The operation of the optical encoder 1 is shown in FIG. 3a. Laser pulses of one chip time duration are coupled into the first input terminal of the 2×2 EO coupler 11 with period of p chip times. When the chip equals to 1, the coupling ratio of the 2×2 EO coupler 11 is set to $c_x$. For example, as shown in FIG. 3a, there are p chips of 1, and the coupling ratios of the p chips are set to $c_1, c_2, \ldots, c_p$. Initially, the laser pulses are entirely coupled to the optical recirculating loop 31 (coupling ratio $c_0=1$) so that the operation of the 2×2 EO coupler 11 is simpler. Therefore, the relative output power of the ith chip $enc_i$ equals to:

$$enc_i = \prod_{n=1}^{i-1} 1 \cdot (1 - c_n) \cdot c_i, \quad \text{where } i = 1 \text{ to } p. \tag{1}$$

In addition, setting $c_1=c_2=c_3=\ldots=c_P=c_E$ simplifies the control of the 2×2 EO coupler 11. After outputting the $p^2$th chip, the semiconductor optical amplifier 21 is switched off so as not to amplify the laser remaining in the optical recirculating loop 31.

Referring to FIG. 1b, the possible output waveforms 6 outputted from the optical encoder 1 and inputted into the fiber-optic network are shown.

Figure 2:
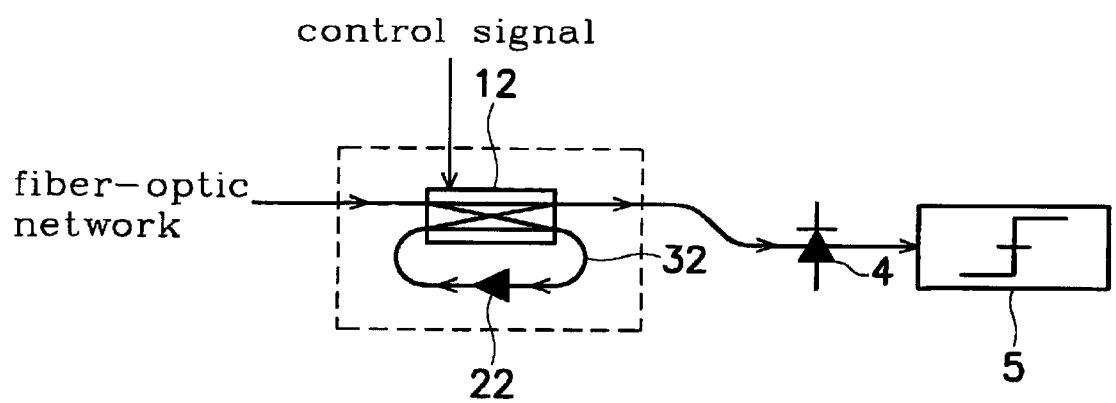
FIG. 2 shows an arrangement of a tunable optical decoder according to the present invention.

Referring to FIG. 2, an arrangement of a tunable optical decoder according to the present invention is shown. The optical decoder 2 includes a 2×2 EO coupler 12, an optical recirculating loop 32 (waveguide) which comprises a semiconductor optic amplifier 22, a light detector 4, and a bit determining device 5. In addition, the 2×2 EO coupler 12, the optical recirculating loop 32 (waveguide), and the semiconductor optic amplifier 22 compose a tunable optic correlator.

Similar to the description of the encoder, the 2×2 EO coupler 12 divides the multiple-level pulses received from the fiber-optic network into a first group and a second group according to optical coupling ratios varied with controlling signals which are inputted from the control signal input terminal (not shown) of the 2×2 EO coupler 12, then couples the first group into the optical recirculating loop 32. When the chip equals to 0, the 2×2 EO coupler 12 is set to a bar state. To compensate the amount of optical energy loss when the laser pulses are circulated, the loop gain of the optical recirculating loop 32 is set to 1 by the gain of the semiconductor optic amplifier 22. When the chip equals to 1, the 2×2 EO coupler 12 couples the first group of multiple-level pulses in the optical recirculating loop 32 to be added into the second group of multiple-level pulses remaining in the optical recirculating loop 32. After that, the 2×2 EO coupler 12 is set to a cross state to output the optical energy remaining in the optical recirculating loop 32. Subsequently, the light detector 4 detects the optic signals and transforms the optic signals into electric signals. Then the bit determining device 5 receives the electric signals from the light detector 4 and outputs a bit value.

Figure 3B:
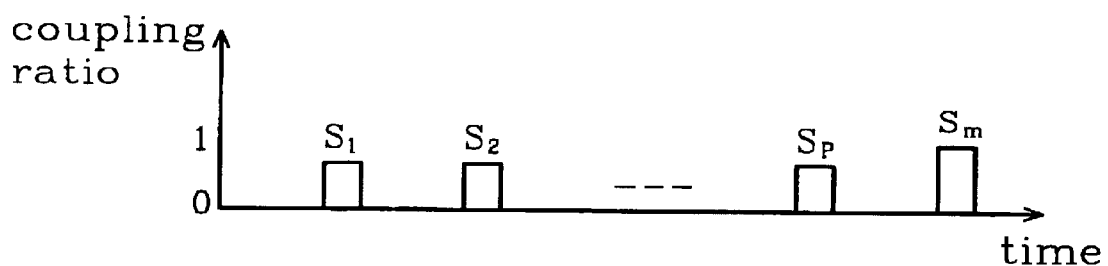

The operation of the optical decoder 2 is shown in FIG. 3b. When the chip equals to 0, the coupling ratio of the 2×2 EO coupler 12 is set to 0. When the chip equals to 1, the coupling ratio of the 2×2 EO coupler 12 is set to $s_x$. For example, as shown in FIG. 3b, there are p chips of 1, and the coupling ratios of the p chips are set to $s_1, s_2, \ldots, s_p$. Therefore, the relative output power contributed from the ith chip $dec_i$ equals to:

$$dec_i = enc_i \cdot \prod_{n=i+1}^{p} (1 - s_n) \cdot s_i, \quad \text{where } i = 1 \text{ to } p. \tag{2}$$

The coupling ratio of the last chip is set to 1 (i.e. coupling ratio $s_m=1$) to couple out the power to the light detector 4.

In addition, setting $s_1=s_2=s_3=\ldots=s_P=s_D$ simplifies the coupling ratios of the 2×2 EO coupler 12. Further, the contribution from each chip can be made equal (i.e. $dec_1=dec_2=dec_3=\ldots dec_p$) by setting $S_d$ equals to $c_e$. Therefore, after decoding a prime code, the total relative output power $dec_{tot}$ equals to:

$$dec_{tot} = p \cdot s_D^2 \cdot (1 - S_D)^{p-1}. \tag{3}$$

wherein the maximum value of $dec_{tot}$ is obtained if $s_D$ are set to $2/(p+1)$:

$$dec_{tot}^{max} = p \cdot \left(\frac{2}{p+1}\right)^2 \cdot \left(\frac{p-1}{p+1}\right)^{p-1}. \quad (4)$$

A different encoding waveform can be obtained by setting $c_x$ and $s_x$ to different forms. For example, we let that:

$$c_i = \frac{1}{p-i+1}, \quad \text{where } i = 1 \text{ to } p. \quad (5)$$

According to equation (1), the $enc_i$ can be calculated:

$$enc_i = \frac{1}{p}. \quad (6)$$

Similarly, we can also suppose that:

$$s_i = \frac{1}{i}, \quad \text{where } i = 1 \text{ to } p. \quad (7)$$

According to equation (2), the $dec_i$ can be calculated:

$$dec_i = \frac{1}{p^2}. \quad (8)$$

Therefore, after decoding a prime code, the total relative output power $dec_{tot}$ equals to:

$$dec_{tot} = \frac{1}{p}. \quad (9)$$

Normally, a prime code is processed by p fibers having fixed lengths. As described above, the remaining optical power after the encoding or decoding proces is $1/p$ of the original amount of power, respectively. Therefore, the relative remaining output power after encoding and decoding equals to:

$$1/p^2 \quad (10).$$

Figure 4:
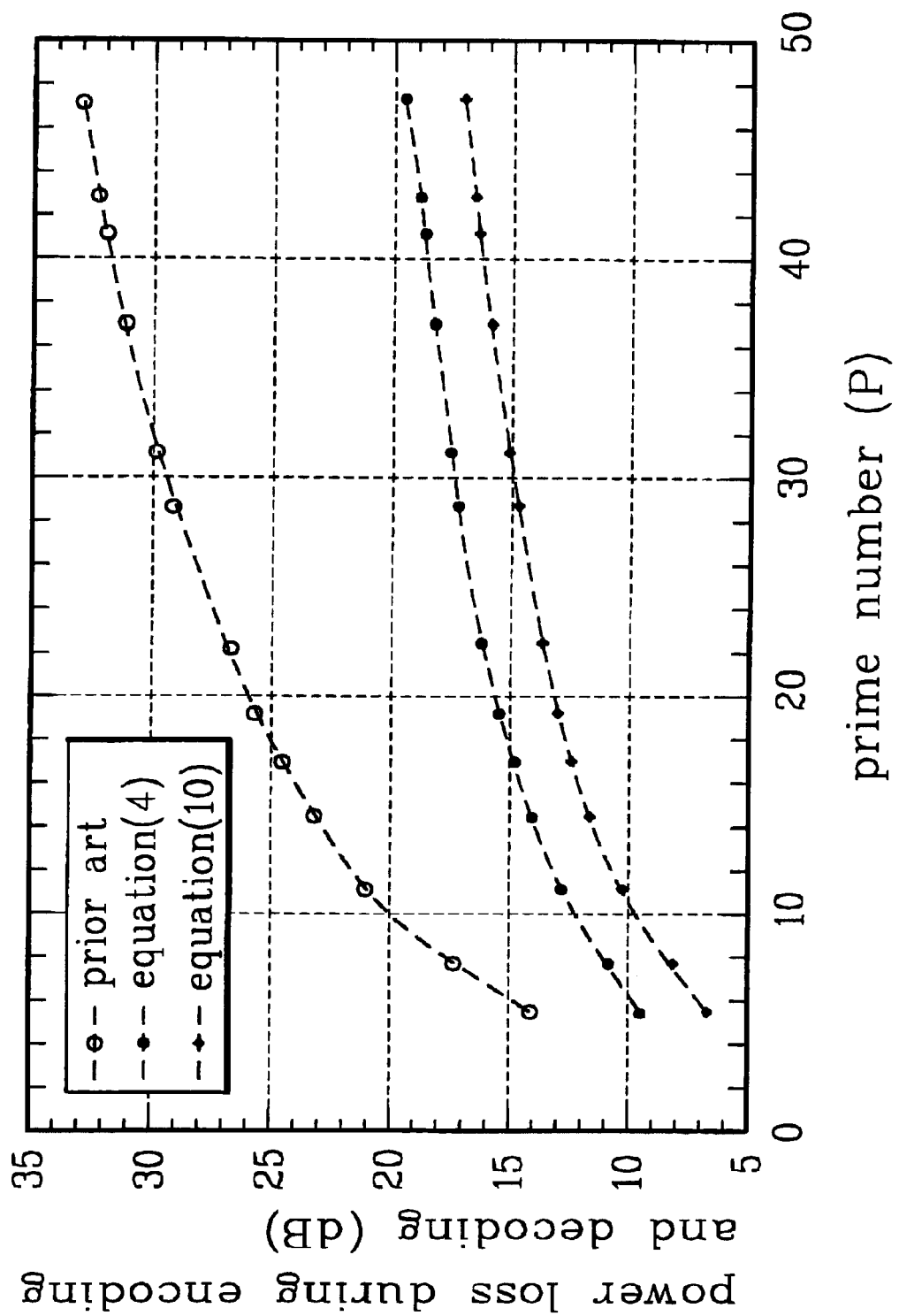
FIG. 4 shows the comparison of prior art and two examples of the power loss during encoding and decoding.

The comparison of the power loss of the prior art and the results according to the equation (4), (9), and value (10) are shown in FIG. 4. It is clear that the power loss of to the present invention is much lower than that of prior art.

An optical encoder and a decoder according to the present invention are easily controlled, fully tunable, and have low amount of energy loss during encoding or decoding. In particular, the apparatuses have simple structures, and can be integrated on a photonic integrated circuit so that the reliability is increased and the cost of production decreased. Further, the encoder and a decoder can be applied in an optic network such as a fiber optic code division multiple access network to transmit signals effectively.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An optical encoder for outputting multiple-level codes, comprising
    an Electro-Optic (EO) coupler having a first and a second input terminal, and having a first and a second output terminal, and a control signal input terminal; and
    an optical recirculating loop which comprises an amplifier coupled between the second output terminal and the second input terminal;
    wherein the first input terminal receives laser pulses, and the EO coupler divides the received laser pulses into a first group and a second group according to a controllable coupling ratio varied by controlling signals fed to the control signal input terminal, then couples the first group of feedback light pulses to the optical recirculating loop by the second outputting terminal, so that the feedback light pulses are amplified by the amplifier, and the second input terminal receives the amplified feedback light pulses which are fed back to the second group of light pulses by the EO coupler, and the first output terminal outputs multiple-level light pulses as multiple-level codes;
    wherein the controlling signals are in the form of p chips of first logic and $(p_2-p)$ chips of second logic; the controllable coupling ratio corresponding to the p chips of first logic being set to $c_1, c_2, \ldots, c_p$ respectively; and the feedback laser pulses are coupled to the optical recirculating loop with an initial coupling ratio $c_0$ and the relative output power ($enc_i$) of the ith chip of the multiple-level codes equal to $$\prod_{n=1}^{i-1} c_0 \cdot (1 - c_n) \cdot c_i,$$

where i=1 to p.

2. The apparatus as claimed in claim 1, wherein the coupling ratio is varied by adding a voltage to the EO coupler.

3. The apparatus as claimed in claim 1, wherein each of the first and second controllable coupling ratio is set to a value not equals to zero when the chip equal to 1, while each of the first and second controllable coupling ratio is set to zero when the chip equals to zero.

4. The apparatus as claimed in claim 1, wherein the amplifier is a semiconductor optic amplifier.

5. The apparatus as claimed in claim 1, wherein the amplifier is a fiber amplifier.

6. The apparatus as claimed in claim 1, wherein the multiple-level light pulses are multiple-level prime codes.

7. The apparatus as claimed in claim 1, wherein the coupling ratio is set to a value not equal to zero when laser pulses from the first input terminal are coupled into the optical recirculating loop, while the coupling ratio is set to zero when no laser pulses from the first input terminal are coupled into the optical recirculating loop.

8. An optical decoder for outputting a bit value, comprising:
    an Electro-Optic (EO) coupler having a first and a second input terminal, and having a first and a second output terminal;
    an optical recirculating loop which comprises an amplifier coupled between the second output terminal and the second input terminal, wherein the first input terminal receives multiple-level light pulses, and the EO coupler divides the received multiple-level light pulses into a first group and a second group according to a coupling ratio, then couples the first group of multiple-level light pulses (feedback multiple-level light pulses) to the optical recirculating loop by the second output terminal, so that the feedback multiple-level light pulses are amplified by the amplifier, and the second input terminal receives the amplified feedback multiple-level light pulses which are fed back to the second group of multiple-level light pulses by the EO coupler, and the first output terminal outputs light waves;

a light detector, coupled to the first output terminal of the EO coupler, transforming the optic signals into electric signals; and a bit determining device coupled to the light detector for outputting a bit value.

9. The apparatus as claimed in claim 8, wherein the coupling ratio is varied by adding a voltage to the EO coupler.

10. The apparatus as claimed in claim 8, wherein the amplifier is a semiconductor optic amplifier.

11. The apparatus as claimed in claim 8, wherein the amplifier is a fiber amplifier.

12. The apparatus as claimed in claim 8, wherein the coupling ratio is set to a value not equal to zero when light pulses from the first input terminal are coupled into the optical recirculating loop, while the coupling ratio is set to zero when no light pulses from the first input terminal are coupled into the optical recirculating loop.

13. A photonic integrated circuit at least comprising:

an optical encoder for outputting multiple-level codes, and an optical decoder for outputting a bit value;

wherein the optical encoder comprises:

a first Electro-Optic (EO) coupler having a first and a second input terminal, and a first and a second output terminal; and a first optical recirculating loop which comprises a first amplifier coupled between the second output terminal and the second input terminal; wherein the first input terminal receives laser pulses, and the EO coupler divides the received laser pulses into a first group and a second group of light pulses according to a controllable coupling ratio, then couples the first group of light pulses (feedback light pulses) to the first optical recirculating loop by the second output terminal, so that the feedback light pulses are amplified by the first amplifier, and the second input terminal receives the amplified feedback light pulses which are fed back to the second group of light pulses by the first EO coupler, and the first output terminal outputs multiple-level light pulses as the multiple-level codes; and wherein the optical decoder comprises:

a second Electro-Optic (EO) coupler having a third and a fourth input terminal, and a third and a fourth output terminal; and an second optical recirculating loop which comprises a second amplifier coupled between the fourth output terminal and the fourth input terminal; wherein the third input terminal receives the multiple-level pulses, and the second EO coupler divides the received multiple-level light pulses into a third group and a fourth group according to a second controllable coupling ratio, then couples the third group of multiple-level light pulses (feedback multiple-level light pulses) to the second optical recirculating loop by the fourth output terminal, so that the feedback multiple-level light pulses are amplified by the second amplifier, and the fourth input terminal receives the amplified feedback multiple-level light pulses which are fed back to the fourth group of multiple-level light pulses by the second EO coupler, and the third output terminal outputs light waves;

a light detector, coupled to the third input terminal of the second EO coupler, transforming the optic signals into an electric signals; and a bit determining device coupled to the light detector for outputting the bit value.

14. The apparatus as claimed in claim 13, wherein the first coupling ratio is varied by adding a first voltage to the first EO coupler, and the second coupling ratio is varied by adding a second voltage to the second EO coupler.

15. The apparatus as claimed in claim 13, wherein the first and second amplifiers are semiconductor optic amplifiers.

16. The apparatus as claimed in claim 13, wherein the first and second amplifiers are fiber amplifiers.

17. The apparatus as claimed in claim 13, wherein the multiple-level light pulses are multiple-level prime codes.

* * * * *